United States Patent [19]

Billingham et al.

[11] Patent Number: 5,632,934
[45] Date of Patent: May 27, 1997

[54] PACKING WITH IMPROVED CAPACITY FOR RECTIFICATION SYSTEMS

[75] Inventors: John F. Billingham, Tonawanda; Michael J. Lockett, Grand Island, both of N.Y.

[73] Assignee: Praxair Technology, Inc., Danbury, Conn.

[21] Appl. No.: 620,202

[22] Filed: Mar. 22, 1996

Related U.S. Application Data

[63] Continuation of Ser. No. 317,499, Oct. 4, 1994, abandoned.

[51] Int. Cl.$^6$ ........................................... B01F 3/04
[52] U.S. Cl. ............................................... 261/112.2
[58] Field of Search ................................. 261/112.2

[56] References Cited

U.S. PATENT DOCUMENTS

| | | | |
|---|---|---|---|
| 2,485,849 | 10/1949 | Simmons | 261/112.2 |
| 2,783,982 | 3/1957 | Kahl | 261/112.2 |
| 2,793,017 | 5/1957 | Lake | 261/112.2 |
| 3,081,987 | 3/1963 | Meek et al. | 261/112.2 |
| 3,132,190 | 5/1964 | Engalitcheff, Jr. | 261/112.2 |
| 3,265,550 | 8/1966 | Lindqvist | 261/112.2 |
| 3,266,553 | 8/1966 | Munters | 261/112.2 |
| 3,415,502 | 12/1968 | Munters | 261/112 |
| 3,466,151 | 9/1969 | Sicard | 261/112.2 |
| 3,500,615 | 3/1970 | Meek | 261/112.2 |
| 3,526,393 | 9/1970 | Meek | 261/112.2 |
| 3,801,419 | 4/1974 | Meek | 261/112.2 |
| 4,052,491 | 10/1977 | Lefevre | 261/112.2 |
| 4,186,159 | 1/1980 | Huber | 261/112 |
| 4,296,050 | 10/1981 | Meier | 261/112 |
| 4,657,711 | 4/1987 | Wigley | 261/79.2 |
| 4,838,913 | 6/1989 | Victor et al. | 62/22 |
| 4,929,399 | 5/1990 | Lockett et al. | 261/112.2 |
| 4,950,430 | 8/1990 | Chen et al. | 261/112.2 |
| 5,019,144 | 5/1991 | Victor et al. | 62/22 |
| 5,055,239 | 10/1991 | Thomas | 261/112.2 |
| 5,063,000 | 11/1991 | Mix | 261/112.2 |
| 5,100,448 | 3/1992 | Lockett et al. | 62/24 |
| 5,132,056 | 7/1992 | Lockett et al. | 261/112.2 |
| 5,158,712 | 10/1992 | Wilhelm | 261/79.2 |
| 5,234,741 | 8/1993 | Kaftrell | |
| 5,267,444 | 12/1993 | Lehman et al. | |

FOREIGN PATENT DOCUMENTS

| | | | |
|---|---|---|---|
| 247244 | 12/1960 | Australia | 261/122.2 |
| 294635 | 2/1971 | U.S.S.R. | 261/112.2 |
| 0700773 | 11/1979 | U.S.S.R. | 261/112.2 |

Primary Examiner—Tim R. Miles
Attorney, Agent, or Firm—Stanley Ktorides

[57] ABSTRACT

Improved capacity structured packing arranged in a section or brick wherein the packing in the base region of the section is configured differently from the structured packing in the bulk region making resistance to gas flow between the packing sheets in the base region less than resistance to gas flow between the sheets in the bulk region.

17 Claims, 7 Drawing Sheets

PACKING WITH IMPROVED CAPACITY FOR RECTIFICATION SYSTEMS

This application is a Continuation of prior U.S. application Ser. No. 08/317,499 filing date Oct. 4, 1994, now abandoned.

TECHNICAL FIELD

This invention relates to structured packing and its use for carrying out separation of a fluid mixture by countercurrent vapor-liquid contact such as the cryogenic rectification of air.

BACKGROUND ART

Distillation of a fluid mixture, e.g. air, into two or more portions enriched in a respective mixture component has generally been carried out employing one or more distillation or rectification columns which employ trays as the column internals or mass transfer elements. Recently there has developed an increasing use of structured packing as mass transfer elements in rectification columns because structured packing has a much lower pressure drop than does trays.

While structured packing has advantages over conventional trays in the operation of a distillation column, the cost of the packing is generally higher than that of the trays. The volume of packing required to effect a separation depends on the packing height and the column diameter. The latter is set by the capacity of the packing or equivalently by the flooding point wherein gas or vapor and liquid no longer effectively flow in countercurrent contact. A structured packing which has increased capacity thus enabling increased column throughput before reaching flood conditions would be very desirable.

Accordingly, it is an object of this invention to provide structured packing which enables improved performance over conventional structured packing.

It is another object of this invention to provide a structured packing for use in a rectification column having increased capacity enabling increased column throughput before reaching flood conditions.

SUMMARY OF THE INVENTION

The above and other objects which will become apparent to one skilled in the art upon a reading of this disclosure are attained by the present invention, one aspect of which is:

A structured packing section comprising a plurality of vertically oriented structured packing sheets defining a section height, said section having a base region, comprising up to the lower 50 percent of the section height, and a bulk region comprising at least some of the remainder of the section height, wherein the structured packing sheets in the base region have a configuration such that the resistance to gas flow between the sheets in the base region is less than the resistance to gas flow between the sheets in the bulk region.

Another aspect of the invention is:

A method for countercurrent flow of gas and liquid comprising passing liquid down and passing gas up a structured packing section comprising a plurality of vertically oriented structured packing sheets defining a section height, said section having a base region, comprising up to the lower 50 percent of the section height, and a bulk region comprising at least some of the remainder of the section height, and passing gas through the base region with lower gas flow resistance than gas passing through the bulk region.

The term "column" as used herein means a distillation or fractionation column or zone, i.e., a contacting column or zone wherein liquid and vapor phases are countercurrently contacted to effect separation of a fluid mixture, as, for example, by contacting of the vapor and liquid phases on packing elements. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13-3 *The Continuous Distillation Process.* Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is rectification carried out, at least in part, at temperatures below 150° K.

As used herein, the term "packing" means any solid or hollow body of predetermined configuration, size and shape used as column internals to provide surface area for the liquid to allow mass transfer at the liquid-vapor interface during countercurrent flow of the two phases.

As used herein, the term "HETP" means the height of packing over which a composition change is achieved which is equivalent to the composition change achieved by a theoretical plate.

As used herein, the term "theoretical plate" means a contact process between vapor and liquid such that the exiting vapor and liquid streams are in equilibrium.

As used herein, the term "structured packing" means packing wherein individual members have specific orientation relative to each other and to the column axis. Examples of structured packing are disclosed in U.S. Pat. No. 4,186,159—Huber, U.S. Pat. No. 4,296,050—Meier, U.S. Pat. No. 4,929,388—Lockett, et al. and U.S. Pat. No. 5,132,056—Lockett, et al.

As used herein the term "gas flow resistance" means the pressure drop experienced by the gas per unit height of packing expressed, for example, as mbar/m.

As used herein the term "section height" means the height of a packing section or unit comprised of vertically oriented sheets. This height is the difference between the horizontal plane where the vapor enters the packing unit and the horizontal plane where the vapor exits the packing unit. Each packing unit can be termed a "brick" and stacked bricks comprise the packed column.

DETAILED DESCRIPTION

In general the invention incorporates the discovery that the capacity of structured packing, such as when used in a rectification system, may be significantly increased if the gas flow resistance in the lower region of a structured packing section is reduced from that experienced in the major portion of the structured packing section. That is, the pressure drop associated with the gas or vapor entry into the structured packing section or brick is made to be less than the pressure drop which would be experienced if the configuration of the structured packing in this lower region had the same configuration as in the upper portion of the structured packing section. This localized reduction in gas flow resistance enables an increased flow of gas or vapor up through the structured packing section before the point is reached where the upward flow of gas impedes the downward flow of liquid through the section so that flooding conditions are reached. The increased capacity of the structured packing section enables the use of less structured packing for any given separation thus reducing the cost of carrying out the separation.

The invention may be used in any distillation, absorption or stripping process, which may employ structured packing. One particularly advantageous use is in cryogenic rectification such as in the cryogenic rectification of air into nitrogen, oxygen and/or argon components. Examples of other useful distillation processes include oil fractionations, hydrocarbon separations and alcohol distillations.

The invention will be described in detail with reference to the drawings.

Distillation columns are used for a wide variety of separations in industry. Over the past decade, structured packing has become the internal of choice due to its low pressure drop and high mass transfer efficiency when compared to conventional distillation trays or random packing.

Figure 1:
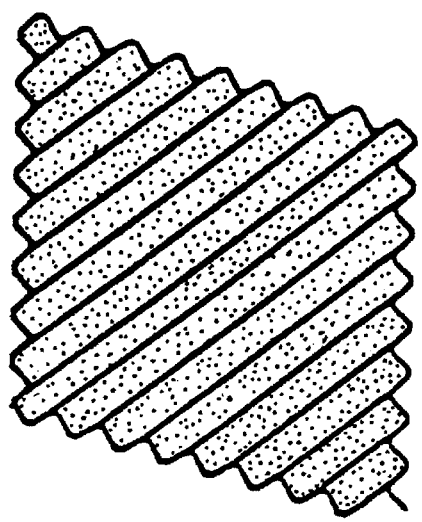
FIGS. 1–5 are representations of general structured packing characteristics which are presented so as to better explain the novel structured packing arrangement of the invention and its use within a column.
Figure 2:
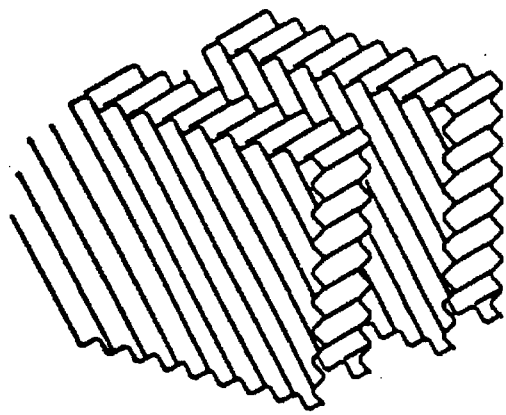
Figure 3:
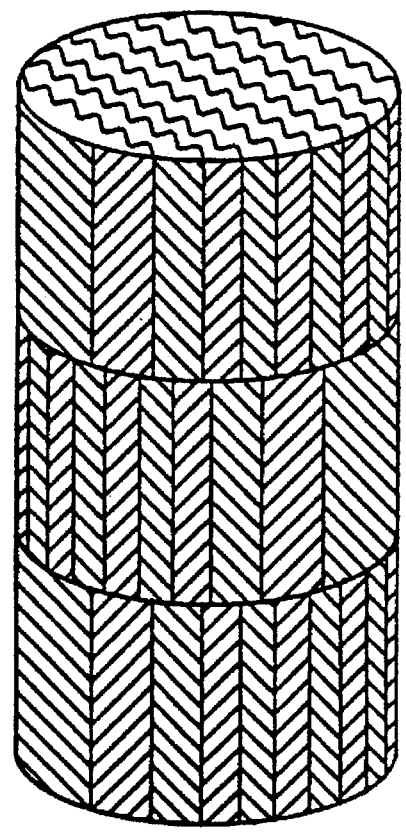
Figure 4:
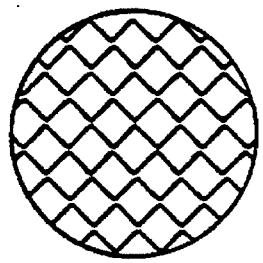
Figure 4:
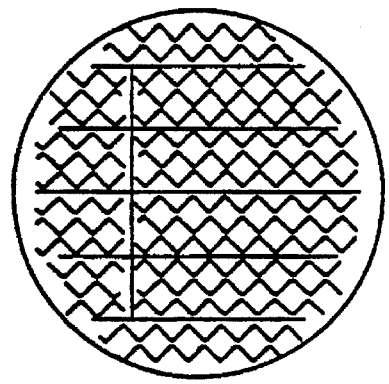
Figure 5:
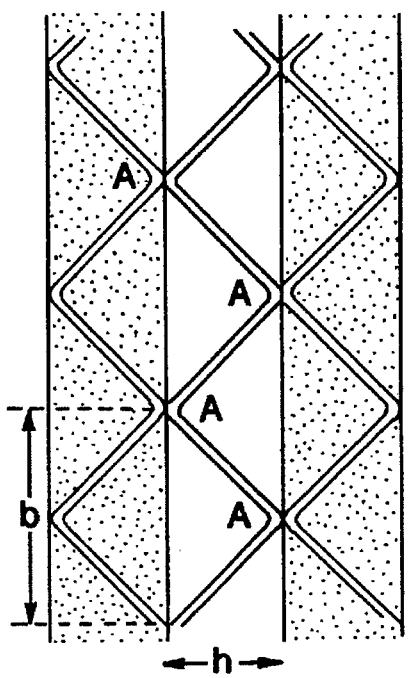

Structured packing comprises vertically oriented sheets with the corrugations at an angle to the vertical axis such as is shown in FIG. 1. Sheets are arranged such that the corrugation direction of adjacent sheets is reversed as shown in FIG. 2. The packing is installed in the column as layers which are generally between 6 and 12 inches in height. Adjacent layers are rotated around a vertical axis to enhance mixing as shown in FIG. 3. In small columns each layer may be comprised of a single section or brick of packing formed by fixing individual sheets together using rods that pierce all of the sheets. In large columns, each packing layer may be made from several sections that fit together to fill the cross-section of the containing vessel. FIG. 4 illustrates a single section layer and a layer with 10 sections. The complete packed bed comprises multiple layers of the packing, the number of layers being set by the height of packing required to perform the separation. FIG. 5 shows a view through the packing denoted as XX on FIG. 3 inclined at the same angle to the vertical as the corrugations. The corrugations are characterized by the crimp height, h, and the base length, b. The corrugation pattern shown is sharp (saw-tooth) but it may also be rounded (sinusoidal). The sheets touch each other at contact points along the peaks and valleys of the corrugation, denoted by A in FIG. 5.

While all corrugated sheet structured packings share the above-described features, there are a large number of variations available commercially. Variations include the use and size of perforations in the packing sheets and the type of surface texture applied to the sheets. Packing is made in several sizes as characterized by the specific surface area (area of surface per unit volume). Different sizes are achieved by variation of the crimp height, h, and the base length, b. For example, reducing the crimp height increases the surface area per unit volume. The use of higher specific surface area packing reduces the height of packing required for a given separation but allowable fluid velocities are decreased. Thus a larger cross-sectional area for flow is required.

The height of the packing is calculated from the product of the number of equilibrium stages required and the height of an equivalent theoretical plate (HETP). The HETP is a measure of the mass transfer efficiency. The cross-sectional area of the column is dictated primarily by the vapor and liquid flowrates and densities. Typically, columns are designed to operate between 80 and 90 percent of the flowrates at the flood point for the packing in question. The flood point may be considered as the maximum vapor flowrate at a fixed liquid flowrate at which the column is operable. Physically, it occurs when the vapor loading is such that the liquid can no longer flow countercurrently under gravity against the vapor. Generally higher specific surface area packings have a lower flood point because the dimensions available for flow between the sheets are smaller.

Figure 6:
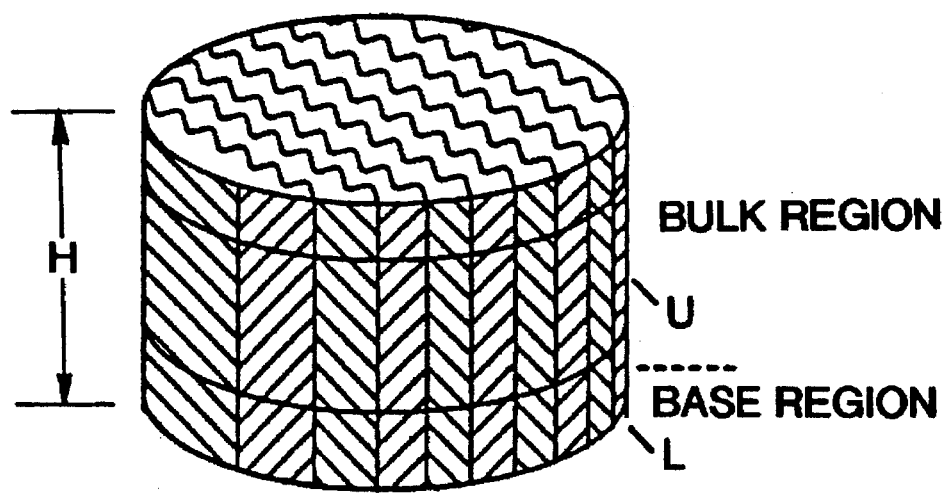
FIGS. 6–14 illustrate several different embodiments of the invention.

The invention comprises a configured structured packing section that reduces the pressure drop associated with the vapor entry into the packing section and thus eases the passage of liquid from the section. The terms gas and vapor flowing through the structured packing section are used synonymously herein. This pressure drop reduction is achieved by configuring the structured packing sheets in the region at the base of each section which is between 0.1 and 20 times h in height (denoted by region L in FIG. 6) such that the geometry in the base region, L, differs from that of the bulk region (denoted by U in FIG. 6) which is defined as that region above the base region. A cylindrical brick or section is shown in FIG. 6 but any brick shape may be used with the invention. Base region L may comprise up to the lower 50 percent of the height H of the structured packing brick or section and preferably comprises the lower 5 percent of the height H and most preferably comprises the lower 2.5 percent of the height H.

Different configurations of the structured packing to enable the gas flow resistance in the base region to be less than the gas flow resistance in the bulk region may be used in the practice of the invention. These types of configurations may be used separately or in combination and four examples are listed below:

(i) Make the hydraulic radius, $R_h$, in the base region greater than in the bulk region, preferably to be 1.1 times its value in the bulk region, where $R_h$ is given by;

$$R_h = \frac{A}{S}$$

where A is the cross-sectional area through the packing in a horizontal plane and S is the wetted perimeter.

(ii) Make the crimp height in the base region less than in the bulk region, preferably to be less than 90 percent of that of the bulk region.

(iii) Make the corrugations in the base region steeper, preferably by at least 5 degrees, in the base region than in the bulk region of the packing.

(iv) Make the fractional open area of the packing material greater, preferably by 20 percent or more, in the base region compared to that in the bulk region of the packing section. By "fractional open area" it is meant in a metal sheet of unit area, the area of the sheet from which metal has been removed, for example, by perforation.

These four types of arrangements wherein the structured packing in the base region of the section differs from the structured packing in the bulk region of the section to effect a lower gas flow resistance in the base region than in the bulk region will be described below in greater detail including illustrations of some specific embodiments.

Structured packing such as is shown in FIGS. 1–4 comprises corrugated sheets stacked vertically and usually connected using one or more rods that extend through the packing to make a section. These sections are typically 6 to 12 inches in height. A packing layer is equal to the section height and extends over the column cross-section which is typically circular. In conventional practice the packing sheets are substantially uniform in height and have straight cut edges such that the base and top of each section or brick are essentially flat. The bricks are stacked one on top of the other.

Figure 7:
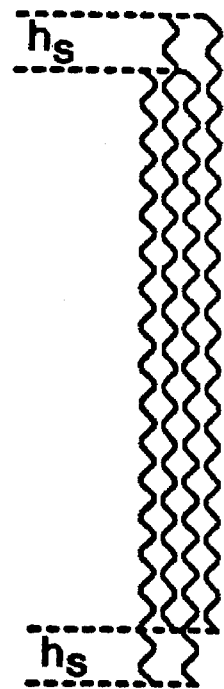

FIG. 7 illustrates in an edge view one embodiment of the invention. In this embodiment sheets that constitute the section are cut to the required length and then alternately staggered in a vertical direction when placed together to form the brick. In this manner, one half of the sheets extend to the bottom of the section and the other half to the top of the section. That is, within the base region a first plurality of structured packing sheets extend beyond the edges of a second plurality of structured packing sheets in alternating sequence. This staggering effectively doubles the hydraulic radius, $R_h$, in the base region over that in the bulk region except for the staggered portion at the upper part of the bulk region. The height of the stagger, $h_s$, is within the range 0.1 h to 20 h, preferably within the range 0.5 h to 2 h. The most optimum value will depend on the specific application. Increasing the stagger height will tend to increase the flood point. Offsetting this is a reduction in the specific surface area in the base region and a reduction in the load bearing capability of the packing. The latter will strongly depend on the material of construction, the specific surface area of the packing, the thickness of the sheets and the possible requirement of supporting column internals on the top of the packing.

Figure 8:
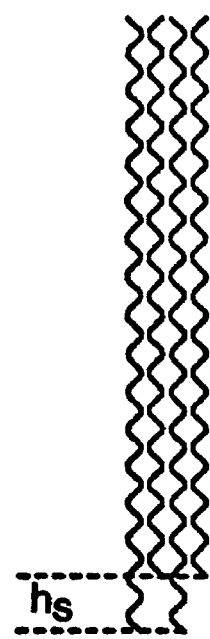

Another staggering embodiment comprises cutting the structured packing sheets such that half have a reduced height. These are then stacked as shown in FIG. 8. The embodiment illustrated in FIG. 8 is a particularly preferred embodiment of the invention. The degree of stagger, $h_s$, is similar to the embodiment illustrated in FIG. 7. In this embodiment the top of the packing is flat whereas in the previously described embodiment the top is also staggered. This staggering arrangement illustrated in FIG. 8 effectively doubles the hydraulic radius, $R_h$, in the base region over that in the bulk region.

Figure 9:
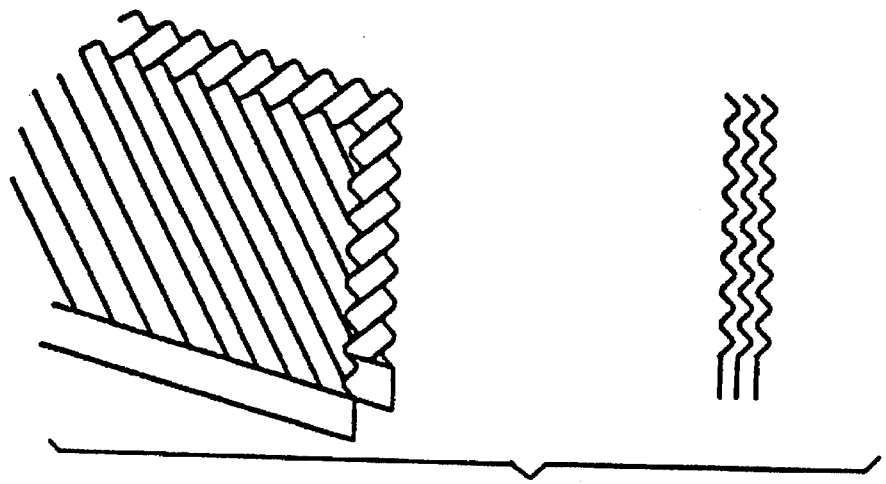
Figure 10:
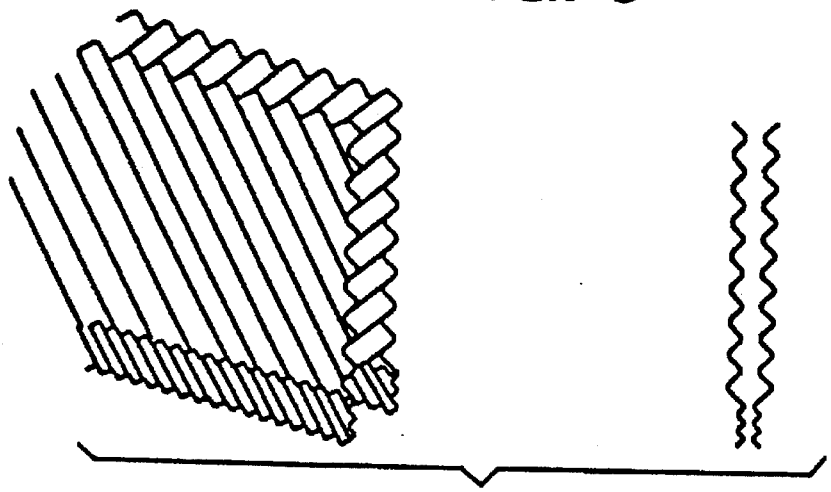
Figure 11:
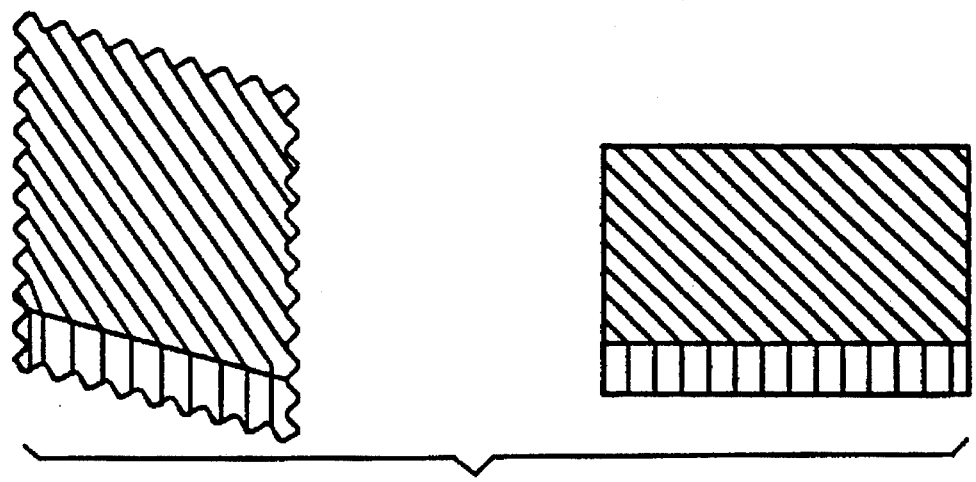

Another means for reducing the pressure drop associated with the gas entry into the brick is to arrange for the gas to take a less tortuous flow path. This may be achieved by reducing the number of contact points (indicated by A in FIG. 5) between neighboring sheets, thus opening the structure and promoting a more vertical flow path. This reduces both the gas velocity and path length for the gas relative to the unmodified packing. Examples of this embodiment are shown in FIGS. 9 to 11. FIG. 9 shows a packing in perspective and edge views with all sheets having a flattened base. FIG. 10 shows a packing in perspective and edge views having corrugations with a reduced crimp height at the base.

In FIG. 11 there is illustrated an embodiment in perspective and face views wherein the base region has the same crimp height but with corrugations at a steeper angle. This reduces the actual gas velocity and thus the pressure drop in the gas region of the packing.

Figure 12:
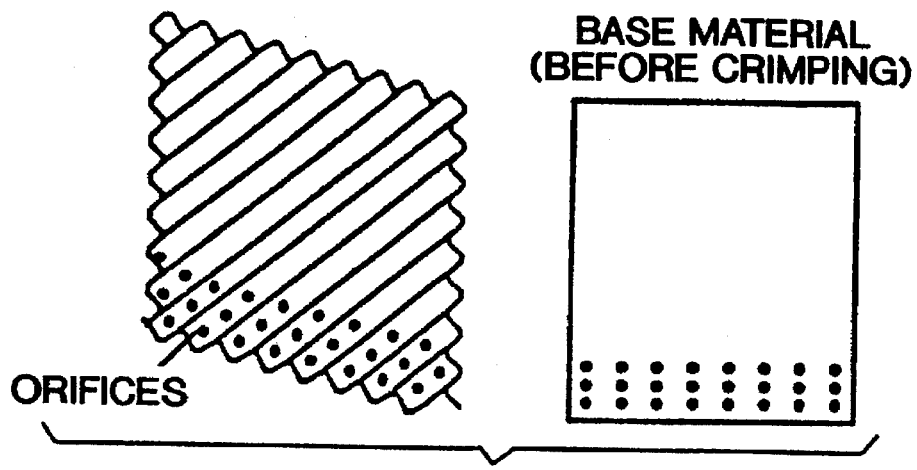
Figure 13:
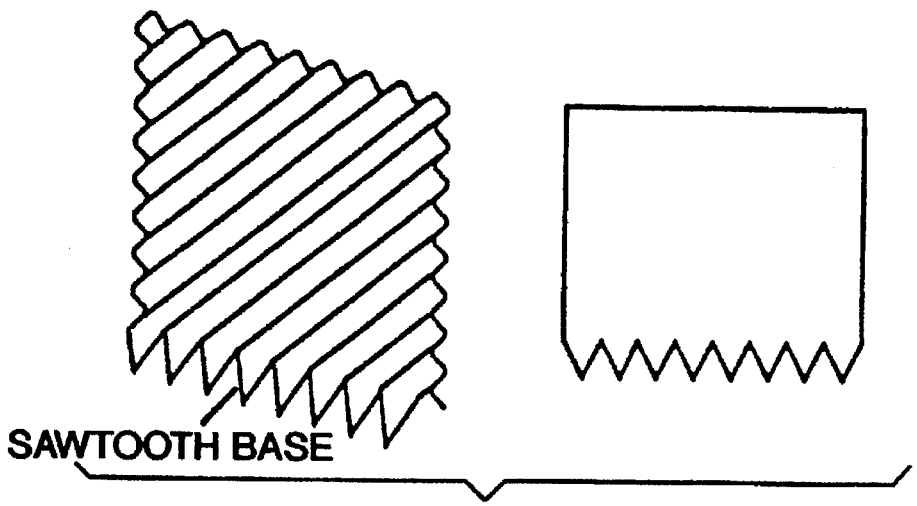
Figure 14:
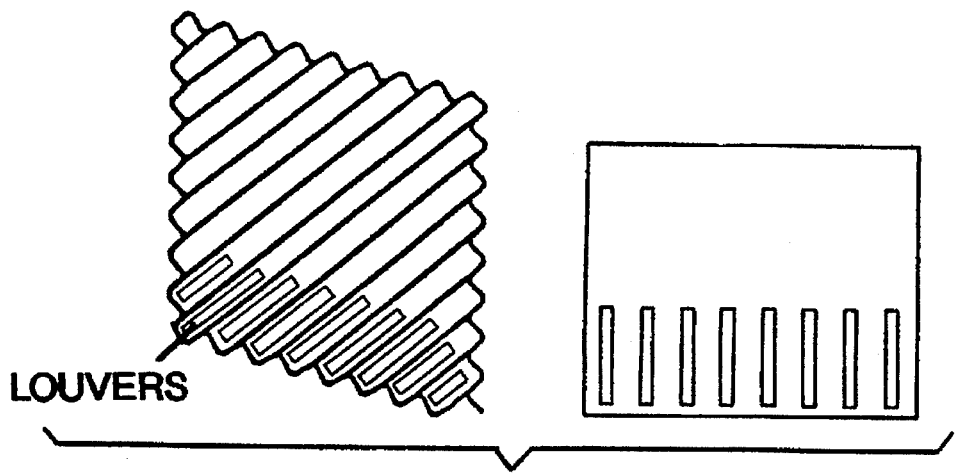

In FIGS. 12–14 there are illustrated embodiments wherein the fractional open area of the material is significantly increased over the bulk of the packing preferably by at least 20 percent. This is achieved through increased perforations, louvers, notches or slots. All of the above will allow passage of vapor through them, resulting in a more vertical flow of vapor and a lower pressure drop in the base region than in the bulk region.

Figure 15:
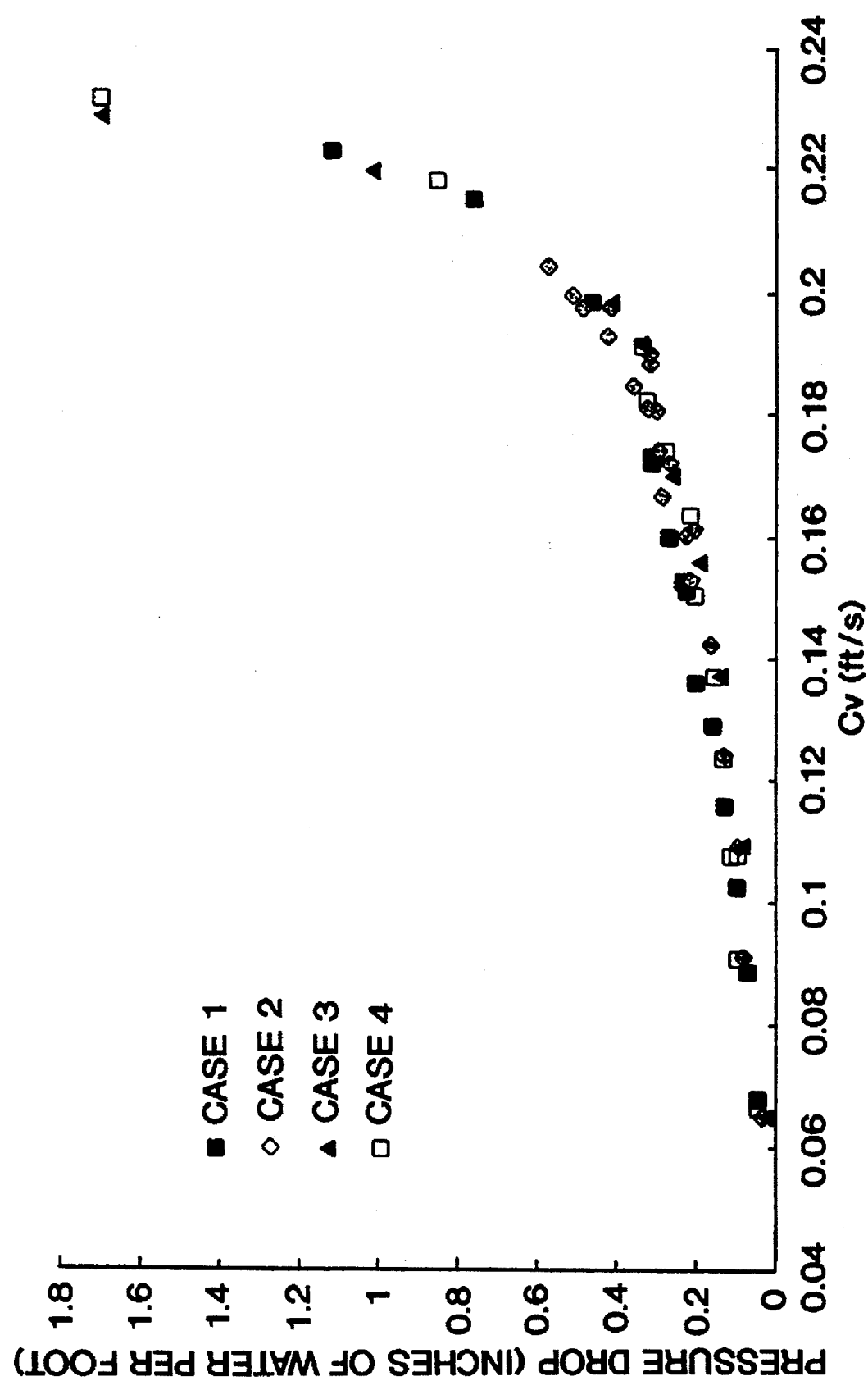
FIGS. 15 and 16 show graphical representations of results attained with the use of the invention and also when the invention is not employed and serve to illustrate the advantages of the use of the invention.
Figure 16:
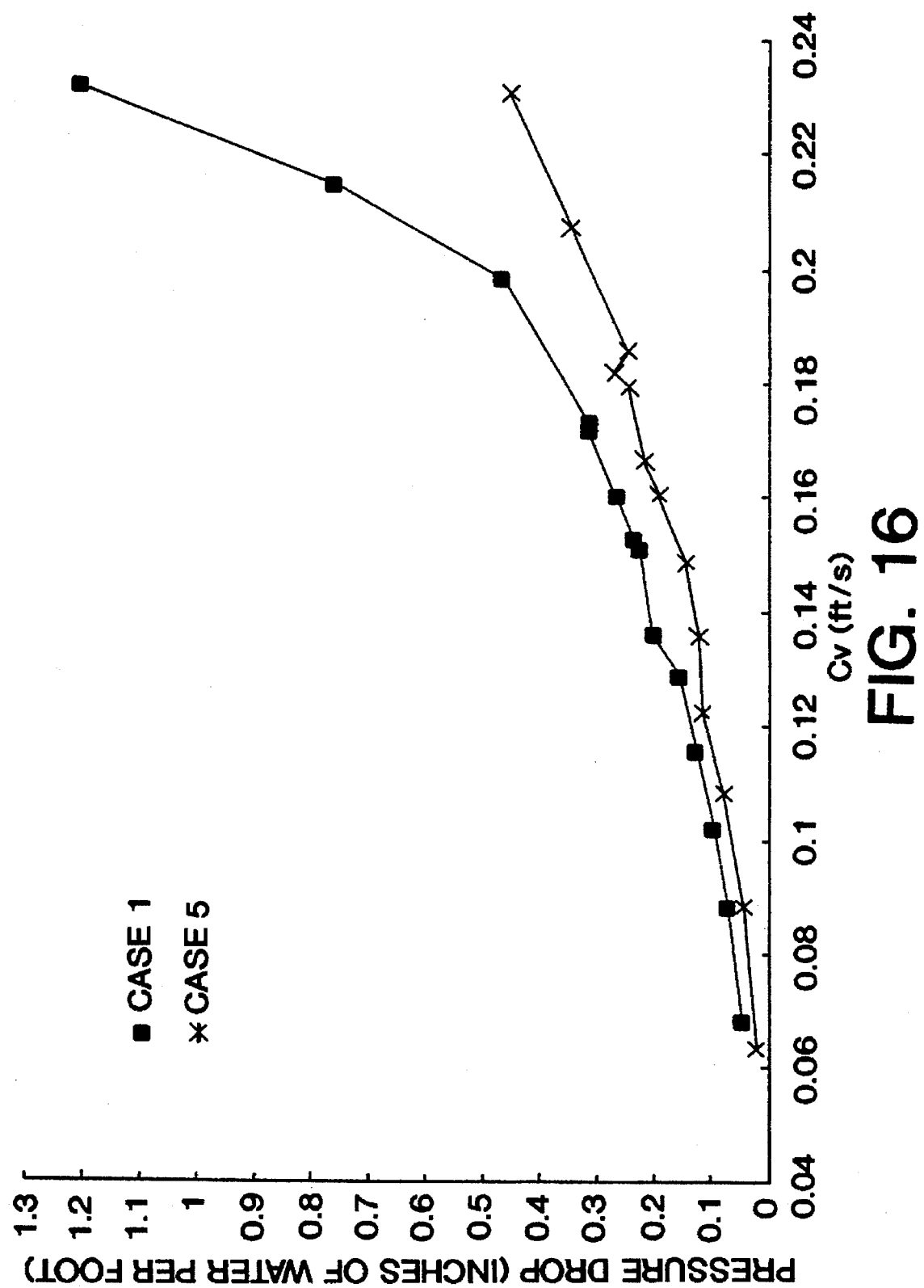

In FIGS. 15 and 16 there is presented data which exemplifies the advantages of the invention over that of conventional structured packing arrangements and also the surprising results obtained with the practice of the invention when compared with the results experienced when the structured packing sections or bricks are spaced from one another. The ineffectiveness of spacing the bricks and the efficacy of the invention was demonstrated by experimental work performed on a 12 inch glass column using 3 bricks of packing. Each brick was approximately 11 inches in height and 11.75 inches in diameter. Each brick constituted one layer in the column. In these tests, the capacity of various packings was tested by measuring the pressure drop over the bed at a fixed water load of 7.4 gallons per minute (gpm) and various air flows. FIGS. 15 and 16 show the results from m packing with a specific surface area of approximately 500 m2/m3. The results are expressed as the pressure gradient over the bed versus the air capacity factor, Cv, defined by;

$$Cv = u_g \sqrt{\frac{\rho_g}{\rho_L - \rho_g}}$$

where $u_g$ is the superficial air velocity based on the column cross-sectional area (ft/s)

$\rho_L$ is the water density (lb/ft$^3$ $\rho_g$ is the air density (lb/ft$^3$

Case 1 represents the pressure drop over the bed of the original, unmodified packing, stacked in the conventional manner. Cases 2–4 show the pressure gradient over the bed with a horizontal spacing between bricks of 1 h, 2 h and 3 h respectively. The spacing was achieved using four metal spacers that allowed greater than 95 percent open area for gas flow in the space between the bricks. Case 5 shows the pressure drop over the bed with the packing sheets alternately staggered between 0.8 and 1.2 times the crimp height, h, as described by FIG. 7, where the crimp height was 0.26 inch. The pressure gradient in all cases was taken as the bed pressure drop divided by the height of the original unmodified packing. The form of the pressure drop versus capacity factor data is typical of structured packings. The rate of increase in pressure drop increases with air flow. At around 0.5 inches of water per foot the pressure drop begins to increase rapidly due to a sharp increase in liquid hold-up. This indicates the onset of loading. The flood point is usually defined as occurring at a pressure drop of 1 to 2 inches of water per foot.

Referring to FIG. 15, no appreciable difference is discernible between the conventional case with no spacing between bricks (Case 1) and the cases with spacing (Cases 2, 3 and 4). In contrast, the staggered structured packing section of the invention gave a dramatic improvement in capacity of about 17 percent as shown in FIG. 16 (Case 5). The improvement was such that the experimental system employed could not provide sufficient air flow to flood the packing. Over the whole range of air flow the pressure drop was consistently lower than for the conventional packing. At a pressure drop of 0.45 inches of water per foot the packing section of the invention with alternating structured packing sheets having different lengths in the base region, i.e. the staggered arrangement, had a Cv of 0.23 ft/s versus a value of 0.195 ft/s for the conventional packing. This represents over a 17 percent increase in capacity.

Another series of tests were performed with a packing of a higher specific surface area (approximately 800 $m^2/m^3$). In these experiments, conventional packing was first tested. A second series of tests were then performed with the sheets at the base of one brick flattened over a base region equivalent to 5 times the crimp height. In this case it was observed that the brick with the flattened base had a greater capacity than the conventional bricks. This was indicated by the fact that as the air rate was increased, significant build-up of liquid around the periphery occurred on all of the bricks except on the brick with the flattened base.

In the practice of the invention it is expected that the gas flow resistance in the base region of the structured packing section will be at least 10 percent, and preferably at least 20 percent, less than the gas flow resistance in the bulk region of the structured packing section.

Although it is preferable that the conditions and arrangements described herein for the base region and the bulk region occur throughout these respective regions, the particular conditions and arrangements may occur in only portions of these respective regions.

Although the invention has been described in detail with reference to certain preferred embodiments, those skilled in the art will recognize that there are other embodiments of the invention within the spirit and the scope of the claims.

We claim:

1. A packing section comprising a plurality of vertically oriented diagonally cross corrugated packing sheets defining a section height, said section having a base region comprising up to the lower 50 percent of the section height, and a bulk region comprising at least some of the remainder of the section height, wherein the crimp height of the packing sheets in the base region is less than the crimp height of the packing sheets in the bulk region such that the resistance to gas flow between the sheets in the base region is less than the resistance to gas flow between the sheets in the bulk region.

2. The packing section of claim 1 wherein the bulk region comprises all of the remainder of the section height.

3. The packing section of claim 1 wherein within the base region a first plurality of packing sheets extend beyond the edges of a second plurality of packing sheets in alternating sequence.

4. The packing section of claim 1 wherein the base region comprises the lower 5 percent of the section height.

5. The packing section of claim 1 wherein the packing sheets have corrugations in the base region which are steeper than the corrugations in the bulk region.

6. The packing section of claim 1 wherein the base region comprises the lower 2.5 percent of the section height.

7. The packing section of claim 1 wherein the fractional open area of the packing section in the base region exceeds the fractional open area of the packing section in the bulk region.

8. The packing section of claim 7 wherein the packing sheets in the base region have serrated edges.

9. The packing section of claim 7 wherein the packing sheets in the base region contain perforations.

10. A bed comprising a plurality of vertically stacked layers, with adjacent layers rotated around a vertical axis, each layer comprising a packing section comprising a plurality of vertically oriented diagonally cross corrugated packing sheets defining a section height, said section having a base region, comprising up to the lower 50 percent of the section height, and a bulk region comprising at least some of the remainder of the section height, said packing section having a flat top, wherein the crimp height of the diagonally cross corrugated packing sheets in the base region is less than the crimp height of the packing sheets in the bulk region such that the resistance to gas flow between the sheets in the base region is less than the resistance to gas flow between the sheets in the bulk region.

11. A method for countercurrent flow of gas and liquid comprising passing liquid down and passing gas up a bed comprising a plurality of vertically stacked layers, with adjacent layers rotated around a vertical axis, each layer comprising a packing section comprising a plurality of vertically oriented diagonally cross corrugated packing sheets defining a section height, said section having a base region, comprising up to the lower 50 percent of the section height, and a bulk region comprising at least some of the remainder of the section height, said packing section having a flat top and wherein the crimp height of the packing sheets in the base region is less than the crimp height of the packing sheets in the bulk region, and passing gas through the base region with lower gas flow resistance than gas passing through the bulk region.

12. The method of claim 11 wherein the bulk region comprises all of the remainder of the section height.

13. The method of claim 11 wherein the base region comprises the lower 2.5 percent of the section height.

14. The method of claim 11 wherein the base region comprises the lower 5 percent of the section height.

15. The method of claim 11 wherein the gas flow resistance of the gas flowing through the base region is at least 10 percent less than the gas flow resistance of the gas flowing through the bulk region.

16. The method of claim 11 wherein the countercurrent flow of gas and liquid occurs while carrying out cryogenic rectification in a column.

17. The method of claim 16 wherein the gas passing up the bed comprises at least two components from the group consisting of nitrogen, oxygen and argon, and the liquid passing down the bed comprises at least two components from the group consisting of nitrogen, oxygen and argon.

* * * * *